United States Patent
Mulder et al.

(10) Patent No.: US 9,180,462 B2
(45) Date of Patent: Nov. 10, 2015

(54) METHOD OF PREPARING A LIQUID EXTRACT OF CEREAL GRAIN AND APPARATUS SUITABLE FOR USE IN SUCH METHOD

(75) Inventors: Hendrikus Mulder, Uitgeest (NL); Cornelis Van Rijn, Katwijk (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 1132 days.

(21) Appl. No.: 13/147,783

(22) PCT Filed: Feb. 5, 2010

(86) PCT No.: PCT/NL2010/050052
§ 371 (c)(1),
(2), (4) Date: Oct. 20, 2011

(87) PCT Pub. No.: WO2010/090522
PCT Pub. Date: Aug. 12, 2010

(65) Prior Publication Data
US 2012/0032007 A1    Feb. 9, 2012

(30) Foreign Application Priority Data
Feb. 5, 2009 (EP) ................. 09152147

(51) Int. Cl.
*B02B 1/06* (2006.01)
*B02B 1/04* (2006.01)
(Continued)

(52) U.S. Cl.
CPC ... *B02B 1/06* (2013.01); *B02B 1/04* (2013.01); *B02C 18/10* (2013.01); *B02C 18/18* (2013.01);
(Continued)

(58) Field of Classification Search
CPC ............ B02C 9/00; B02C 9/04; B02C 13/02; B02C 13/06; B02C 13/14; B02C 13/18; B02C 13/286; B02C 23/08; B02C 23/10; B02C 23/36; B02C 23/38; B02B 1/04; B02B 1/06
USPC .......................... 426/518, 489, 425, 431, 436
See application file for complete search history.

(56) References Cited

U.S. PATENT DOCUMENTS
3,385,528 A    5/1968  Schaus
4,304,176 A    12/1981 Redl
(Continued)

FOREIGN PATENT DOCUMENTS
CN      2576336 Y      10/2003
CN      101352217 A    1/2009
(Continued)

OTHER PUBLICATIONS

Search Report in International Application PCT/NL2010/050052 dated Feb. 3, 2011.

*Primary Examiner* — Shelley Self
*Assistant Examiner* — Matthew G Katcoff
(74) *Attorney, Agent, or Firm* — Gilberto M. Villacorta; Sunit Talapatra; Foley & Lardner LLP

(57) ABSTRACT

The present invention provides a continuous method of preparing a liquid extract of cereal grain by comminuting cereal grain at a rate of at least 100 kg of dry cereal grain per hour and extracting the comminuted cereal grain with a liquid, said method comprising:
  continuously combining cereal grain with a liquid;
  continuously disintegrating the grain particles contained within the liquid by colliding freely suspended grain particles with one or more rotating blades, thereby producing a milled suspension;
  continuously transferring at least a part of the milled suspension, optionally after further treatment, to a separation device for separation into spent grain and liquid extract;
wherein the one or more rotating blades are rotating at a tip speed of at least 10 m/s; the total mechanical energy transferred into the milled suspension by the one or more rotating blades is in the range of 5-1000 kJ per kg of dry cereal grain; and the distance between a tip of said one or more rotating blades and the axis of rotation is in the range of 2-25 cm.
The invention also provides a system for comprising a milling apparatus and a separation device suitable for use in the aforementioned method.
The present method and system offer several advantages, including savings on capital expenditure and maintenance, short milling times and hygienic design.

16 Claims, 4 Drawing Sheets

Figure 1:
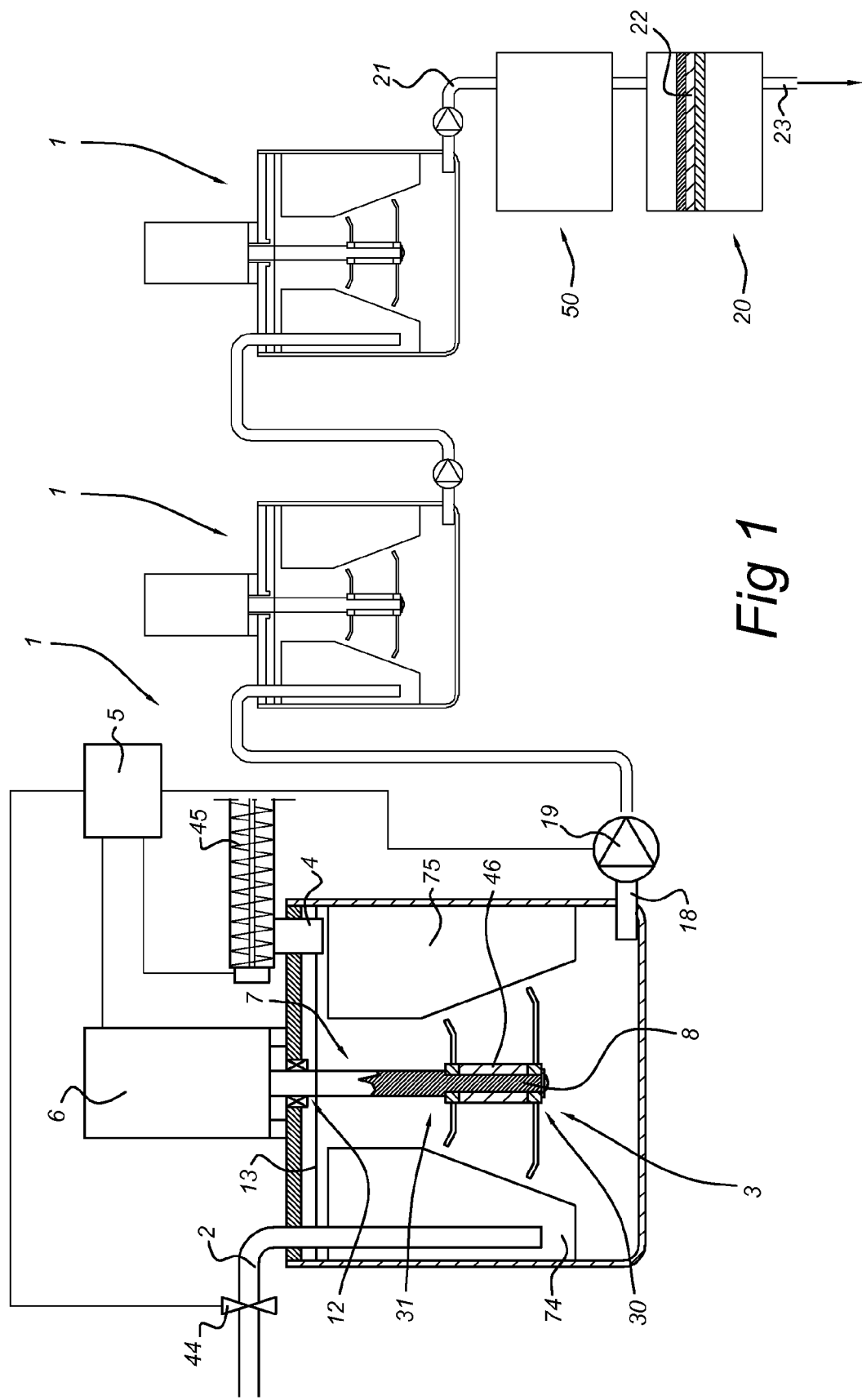

(51) Int. Cl.
   *B02C 18/10*   (2006.01)
   *B02C 18/18*   (2006.01)
   *B02C 18/22*   (2006.01)
   *B02C 21/00*   (2006.01)
   *B02C 25/00*   (2006.01)
   *C12C 7/01*    (2006.01)
   *C12C 7/04*    (2006.01)
   *C12C 7/06*    (2006.01)
   *C12C 7/14*    (2006.01)

(52) U.S. Cl.
   CPC ......... *B02C 18/2216* (2013.01); *B02C 18/2258* (2013.01); *B02C 21/00* (2013.01); *B02C 25/00* (2013.01); *C12C 7/01* (2013.01); *C12C 7/042* (2013.01); *C12C 7/065* (2013.01); *C12C 7/14* (2013.01)

(56) References Cited

U.S. PATENT DOCUMENTS

| | | | |
|---|---|---|---|
| 4,697,748 A | 10/1987 | Widhopf | |
| 6,368,649 B1 * | 4/2002 | van Bommel | 426/482 |
| 6,402,064 B1 * | 6/2002 | Tango et al. | 241/21 |
| 7,452,425 B1 * | 11/2008 | Langhauser | 127/40 |

FOREIGN PATENT DOCUMENTS

| | | |
|---|---|---|
| DE | 1 805 708 | 5/1970 |
| DE | 29 45 976 A1 | 5/1981 |
| DE | 3320045 A1 | 12/1984 |
| DE | 102 55 504 A1 | 6/2004 |
| DE | 20 2005 014 333 U1 | 12/2005 |
| EP | 0 200 165 A2 | 11/1986 |

* cited by examiner

METHOD OF PREPARING A LIQUID EXTRACT OF CEREAL GRAIN AND APPARATUS SUITABLE FOR USE IN SUCH METHOD

TECHNICAL FIELD OF THE INVENTION

The present invention relates to a method of preparing a liquid extract of cereal grain. The method according to the present invention may, for instance, suitably be used in the brewing industry, e.g for wort production.

The invention further provides a system comprising a milling apparatus and a separation device suitable for use in the aforementioned method.

BACKGROUND OF THE INVENTION

In the brewing industry milling of raw materials prior to mashing in for wort production is usually done by one of the following techniques:
- dry milling by roller mill
- dry milling by hammer mill
- wet milling by steeping and roller mill
- conditioned milling (similar to dry milling by roller mill, except that malt moisture level is raised slightly to make the husks of the grains more pliable.
- dispersion pump milling Each of these operations has its advantages and drawbacks in terms of extract yield, oxygen pick-up, separation performance on mash separation, effect on downstream processing, enzymatic performance of grist (mashing time), hygienic aspects, power consumption, dust explosion risks, extraction of tannins from husks, filtration run-off etc.

Wet milling has become less popular due to some major disadvantages associated with this kind of milling technique, notably long residence time distributions for the mash and insufficient milling of poorly modified malts. However, wet milling also has some significant advantages over dry milling. Increased safety regulations with respect to dust explosion risks, for instance, necessitate preventive measures that have driven up the cost of dry milling operations. Wet milling techniques obviously do not require such measures.

The inventors have investigated dispersion pump technology as a possible alternative to dry milling. However, the abrasion of the stator rotor combination due to non-malt particles was found to result in high maintenance costs and unreliable performance.

Hence, there is a need for a milling technique that combines the advantages of wet milling (no dust, minimal safety precautions, simple equipment, low capital expenditure) with the simplicity of e.g. the hammer mill process.

SUMMARY OF THE INVENTION

The inventors have discovered that the aforementioned objective is met by a continuous milling method in which cereal grain particles are disintegrated whilst being suspended in a liquid, said disintegration being achieved by colliding freely suspended grain particles with one or more blades that are rotating at a very high tip speed of at least 10 m/s. In the present method the distance between a tip of said one or more rotating blades and the axis of rotation is in the range of 2-25 cm and the total mechanical energy transferred by the one or more rotating blade is in the range of 5-1000 kJ per kg of dry cereal grain. Thus, the present method employs one or more relatively small rotating blades that rotate at very high speed and that remain in contact with the suspension containing the cereal grain particles for a sufficiently long period of time to achieve a significant particle size reduction.

The method according to the present invention provides all the benefits of wet milling, is no more complex than a hammer mill and extremely robust. The present method utilises the same principle that is applied in standard kitchen blenders, i.e. a blade rotating at very high speed. Due to the inertia of the suspended cereal grain particles, the fast rotating blade is capable of disintegrating these grain particles on impact. Unlike the milling techniques that have so far been used to comminute cereal grains on an industrial scale, the disintegration of the grain particles in the present method does not rely on stressing of the grain particles between two solid surfaces.

According to another aspect a system for preparing liquid extract of cereal grain is provided, the system comprising a milling apparatus and a separation device for separating spent grain and liquid extract connected downstream to the milling apparatus, wherein the milling apparatus comprises a liquid inlet connected to a milling chamber for containing a milled suspension, wherein a rotor is received in the milling chamber, the rotor comprising one or more blades extending from the axis of rotation of the rotor, the blade being received in the milling chamber, wherein a distance between a tip of said one or more blades and the axis of rotation is in the range of 2-25 cm, the rotor being connected to a driving unit for rotation, wherein the driving unit is arranged to drive the blade at a tip speed of at least 10 m/s.

The main advantages of the present method and system can be summarized as follows:
- savings on capital expenditure and maintenance;
- applicable in both batch and continuous brewing;
- short milling times;
- hygienic design due to constant flows through the system.

In addition, the inventors have found that unlike many other milling techniques, the present method can also suitably be used to mill and extract cereal grains with a moisture content exceeding 12%. Finally, the inventors have unexpectedly discovered that the present method, when used to extract e.g. barley, yields a liquid extract having a reduced β-glucan content. This reduction of β-glucan levels has a positive effect on product quality as well as on downstream processing. The benefits of the present method are particularly pronounced when employed in industrial scale production of liquid extracts from cereal grain. Thus, the present method is advantageously employed to prepare a liquid extract of cereal grain by processing cereal grain at a rate of at least 100 kg of dry cereal grain per hour.

DRAWINGS

FIG. 1 schematically shows a first embodiment of a system according to the invention.

Figure 2:
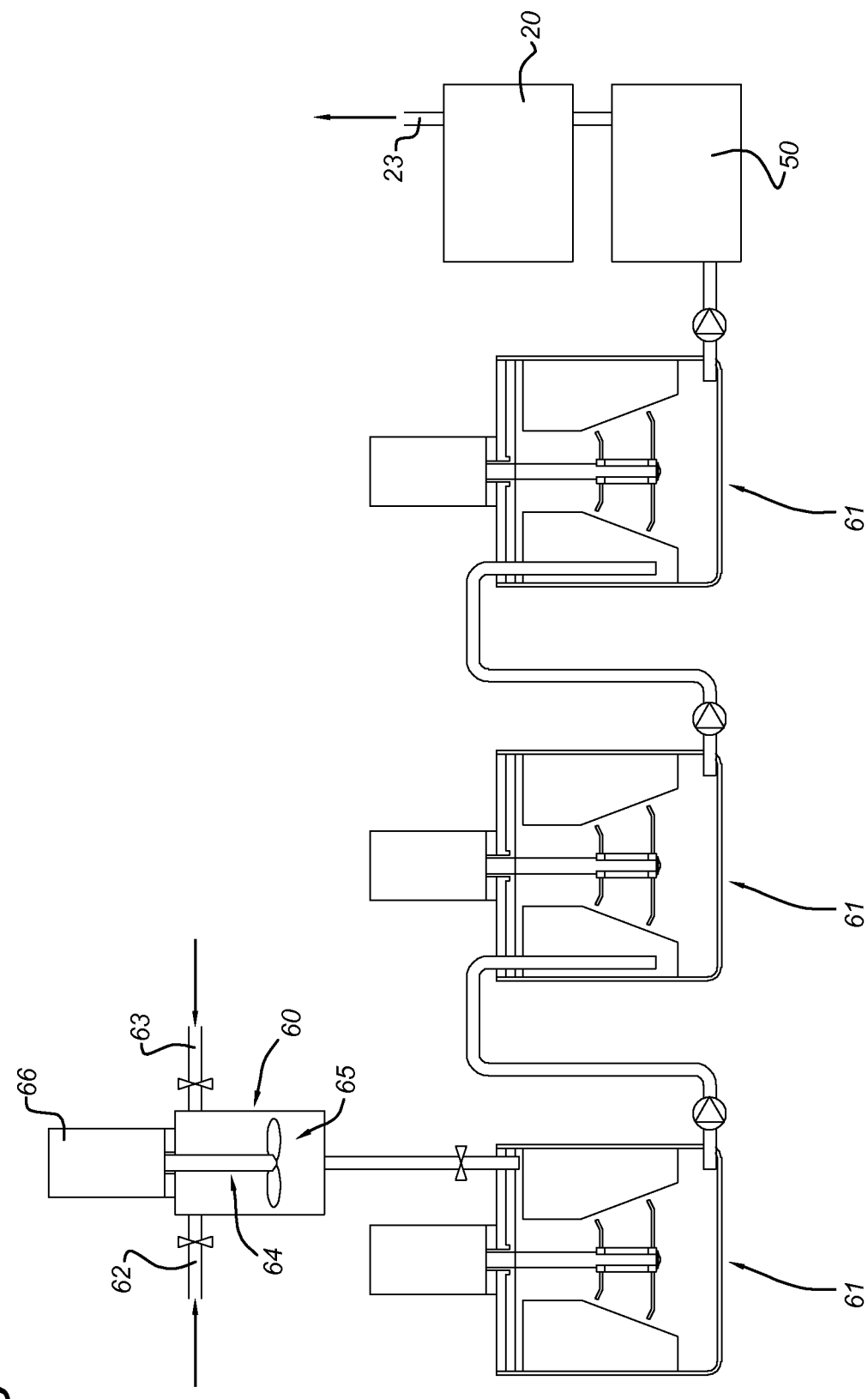

FIG. 2 schematically shows a second embodiment of a system according to the invention.

Figure 3A:
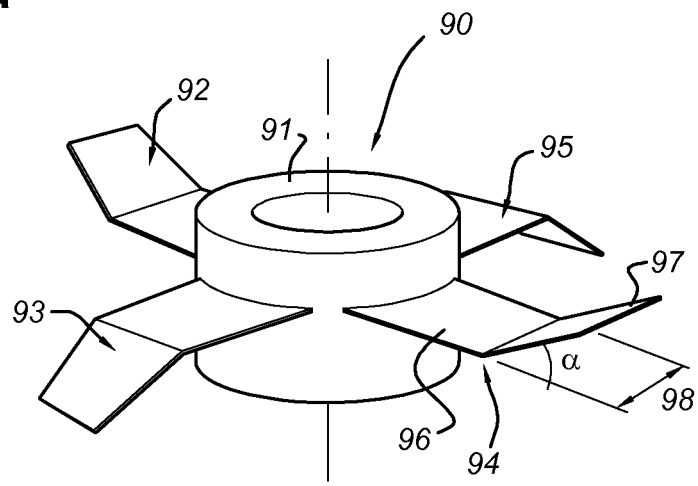
Figure 3B:
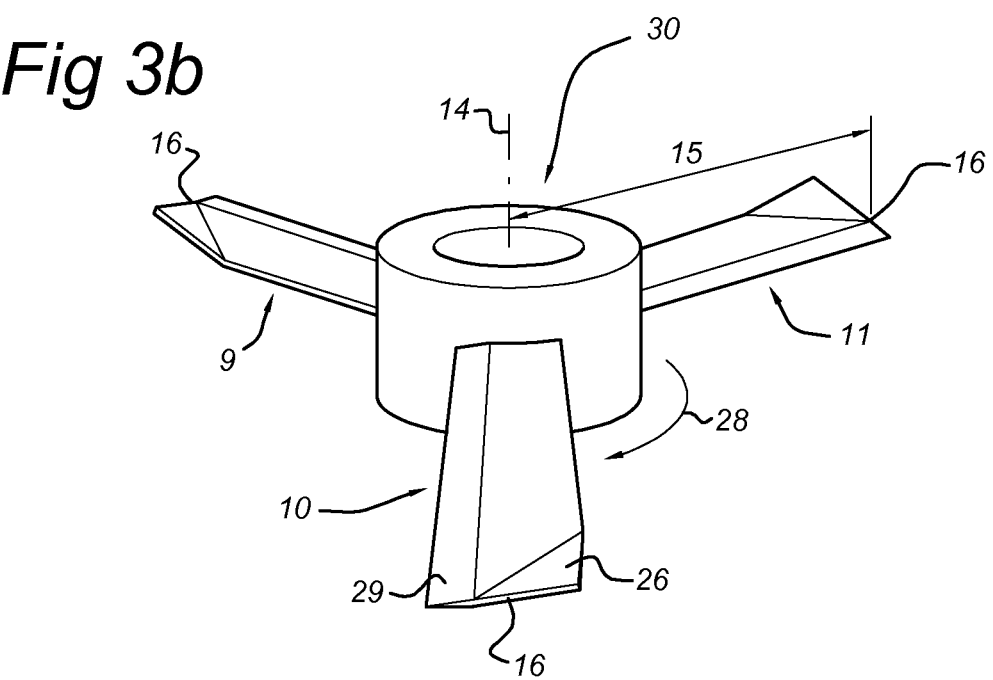

FIGS. 3a and 3b schematically show a detail of a blade according to an embodiment of the invention.

Figure 4:
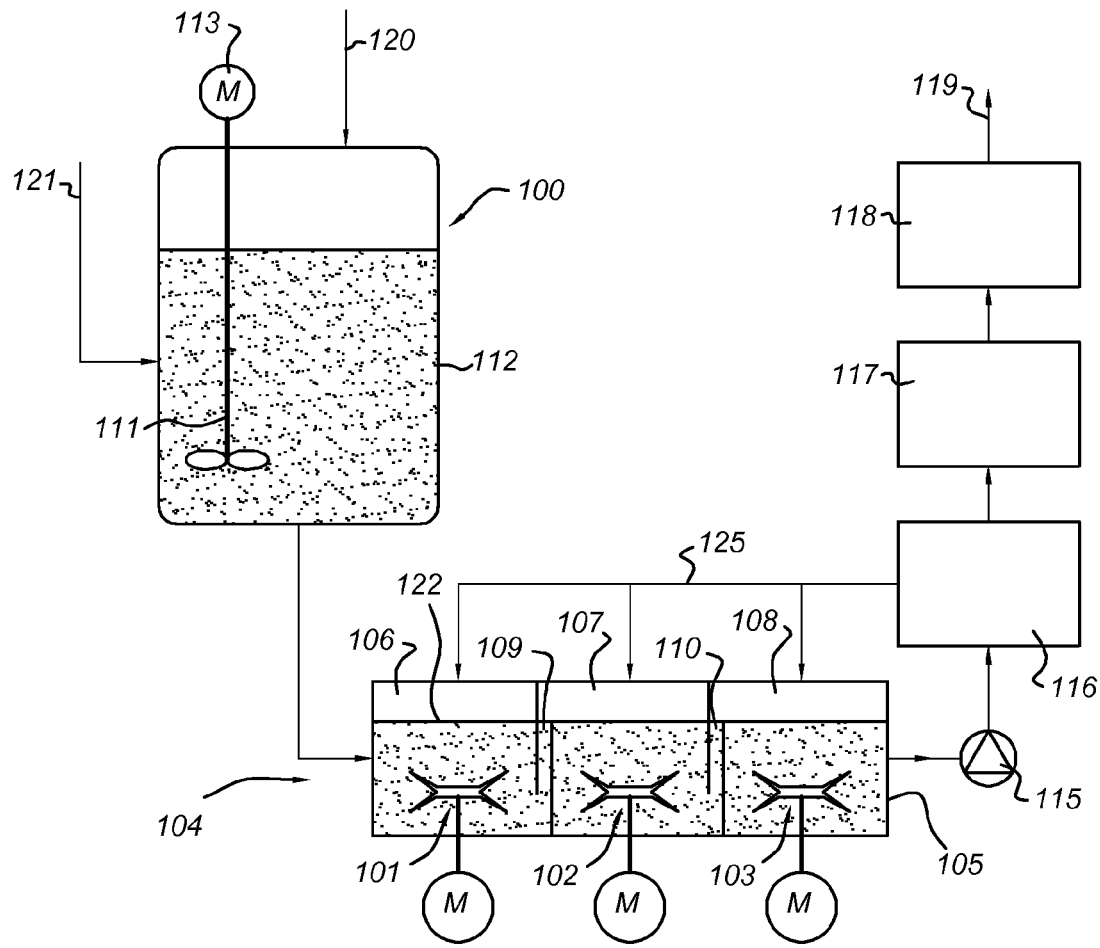

FIG. 4 schematically shows a third embodiment of a system according to the invention.

Figure 5:
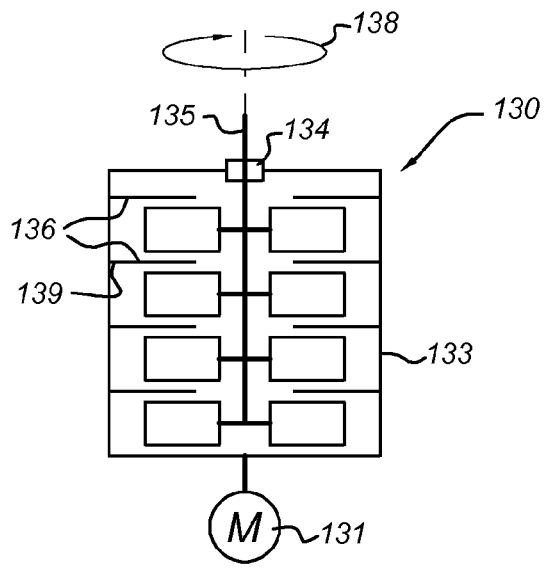

FIG. 5 schematically shows an alternative arrangement of a milling apparatus according to the invention.

DETAILED DESCRIPTION OF THE INVENTION

Accordingly, one aspect of the invention relates to a continuous method of preparing a liquid extract of cereal grain by comminuting cereal grain at a rate of at least 100 kg of dry cereal grain per hour and extracting the comminuted cereal grain with a liquid, said method comprising:

continuously combining cereal grain with a liquid;

continuously disintegrating the grain particles contained within the liquid by colliding freely suspended grain particles with one or more rotating blades, thereby producing a milled suspension;

continuously transferring at least a part of the milled suspension, optionally after further treatment, to a separation device for separation into spent grain and liquid extract;

wherein the one or more rotating blades are rotating at a tip speed of at least 10 m/s; the total mechanical energy transferred into the milled suspension by the one or more rotating blades is in the range of 5-1000 kJ per kg of dry cereal grain; and the distance between a tip of said one or more rotating blades and the axis of rotation is in the range of 2-25 cm.

The term "cereal grain" as used herein refers to a particulate form of a cereal crop, a fruitseed (caryopsis), or a combination of two or more of these materials. The present invention encompasses a method in which the cereal grain employed is a pre-milled cereal grain.

The term "blade" as used herein refers to a solid object that is configured to rotate about an axis of rotation, and that normally includes at least two (blade) wings radially extending in different, e.g. opposite directions from a centre (of gravity) point. One requirement of the blade is that it can suitably be used for disintegrating the grain particles upon impact. In addition, the blade is required to provide agitating action in order to blend the cereal grain with the liquid, thereby assisting in the uniform comminution of the grain particles.

The term "disintegrate" as used herein refers to the breaking up of a solid particle into two or more solid particles. The term "disintegrate" does not encompass the breaking up of loosely bound particles, such as agglomerates.

The term "mechanical energy" as used herein refers to the total amount of potential energy and kinetic energy that is transferred into the milled suspension by the one or more rotating blades. The amount of mechanical energy that is transferred in the present method can be deduced from e.g. the temperature increase caused by the rotating blades and/or it can be calculated from torque that is employed to rotate the blades.

The wording "one or more rotating blades" is to be understood to refer to blades that are moving through the liquid containing the grain particles in a rotating path. According to one embodiment the one or more rotating blades are mounted on a rotating axis or on a rotating body (e.g. on the inside of rotating cylinder). According to another embodiment that is also encompassed by the present invention the one or more rotating blades are mounted on a stationary body and the liquid containing the grain particles is caused to rotate past the blades, e.g. under the influence of rotating paddles Naturally, it is also feasible to enhance the efficacy of the present method by employing blades that are mounted on a rotating body and by causing the liquid to rotate in a direction that is opposed to the direction in which the blades rotate.

The present method is carried out in a continuous fashion, which means that the present process employs an essentially continuous stream of cereal grain and an essentially continuous stream of liquid or alternatively an essentially continuous stream comprising cereal grain and liquid, and furthermore that it yields an essentially continuous stream of milled suspension. The part of the milled suspension that is transferred to a separation device is advantageously continuously separated into liquid extract and spent grain. The liquid extract so obtained can suitably be employed in a batch-wise or continuously operated process, e.g. a brewing process. Thus, the present method can be used in a brewing process that employs batch operations such as batch wort production and batch fermentation. According to a particularly preferred embodiment, the present method is employed in a continuous brewing process that additionally includes continuous wort boiling, continuous trub removal and continuous fermentation.

Further, a system is provided for preparing a liquid extract of cereal grain, said system being suitable for operating the method described herein before. The system comprises a milling apparatus and a separation device for separating spent grain from liquid extract connected downstream to the milling apparatus, wherein the milling apparatus comprises a liquid inlet connected to a milling chamber for containing a milled suspension, wherein a rotor is received in the milling chamber, the rotor comprising one or more blades extending from the axis of rotation of the rotor, the blades being received in the milling chamber, wherein a distance between a tip of said one or more blades and the axis of rotation is in the range of 2-25 cm, the rotor is connected to a driving unit for rotation, wherein the driving unit is arranged to drive the blade at a tip speed of at least 10 m/s.

As mentioned herein before, the present method and system can suitably be operated on an industrial scale. Typically, in the present method the cereal grain is comminuted at a rate of at least 150, preferably 200, more preferably of at least 300 kg of dry cereal grain per hour.

The present method and system offer the advantage that size reduction of the grain particles can be achieved solely by the action of the fast rotating blade(s). Thus, wear and tear as a result of direct or indirect contact between different elements of a milling device, e.g. as a result of foreign objects such as stones, are minimised. Accordingly, in accordance with a highly preferred embodiment of the invention, the disintegration of the grain particles under the action of the one or more rotating blades does not result from stressing the grain particles between a surface of said one or more rotating blades and another solid surface. Clearly, this feature distinguishes the present method from wet milling techniques such as wet milling by steeping and roller mill, conditioned milling and dispersion pump milling.

The present method and system can advantageously be used to achieve a substantial reduction of the particle size of the cereal grain particles. Typically, the disintegration of the grain particles under the action of the one or more rotating blades causes a reduction of the mass weighted average particle size of the cereal grain by at least a factor 2, preferably by at least a factor 4. Most preferably, the one or more rotating blades cause a reduction of said average particle size by at least a factor 8.

The present method and system can suitably be used to prepare a liquid extract from a wide variety of cereal grain materials. Particularly good results are obtained if prior to the disintegration under the action of the one or more rotating blades the grain particles contained within the liquid have a mass weighted average particle size of 0.5 mm to 1 cm, preferably of 1 mm to 8 mm.

The present method and system typically yields a milled suspension wherein the particles have a mass weighted average diameter in the range of 50-1000 μm, preferably in the range of 100-800 μm.

According to a preferred embodiment of the present method large (coarse) particles, e.g. particles having diameter of at least 0.5 mm are selectively removed from the milled suspension during or after the milling operation and before it reaches the separation device, by passing the liquid suspension through a suitable separation element, e.g. a sieve, a screen or a hydrocyclone. The terms "selectively removed" or "selectively separated" means that the coarse particles are removed and that smaller particles remain in the suspension. Even more preferably, particles having a diameter of at least 1.0 mm are removed from the milled suspension. Most preferably, particles having a diameter of at least 2.0 mm are removed. The large particles removed from the milled suspension are preferably recirculated to the milling step, notably by introducing these separated particles into the liquid containing the suspended grain particles. According to a particularly preferred embodiment, the separated particles are recirculated in a continuous fashion.

A feedback loop can be provided from downstream of the milling apparatus to upstream of the milling apparatus. In an embodiment a return conduit can return suspension containing large particles to at least one milling apparatus according to the present invention. It should be understood that the latter embodiment includes recirculation of the separated particles directly to the milling apparatus or upstream of the milling apparatus (e.g. to a mixing device in which the grain particles feed is combined with the liquid).

The liquid and cereal grain are suitably combined in the present method to form a suspension containing 6-50 wt. %, preferably 10-45 wt. % and most preferably 15-40 wt. % of dry matter. Here "dry matter" includes both dissolved and non-dissolved material.

The liquid that is combined with the cereal grain preferably is an aqueous liquid. The aqueous liquid employed can be brewing water. The present invention, however, also encompasses the use of a recirculated aqueous liquids stream that originates from elsewhere in the brewing process. An example of such a recirculated aqueous liquid is washing water that has been used in the present method to wash spent grain.

The milling efficiency of the present method and system are affected by the volume of the chamber in which the disintegration of the grain particles under the action of the rotating blades occurs. If the volume is large, it may take unacceptably long to achieve a substantial particle size reduction. If the volume is very small it will also be difficult to achieve a substantial particle size reduction as the residence time will be so short that only a fraction of the grain particles will have chance to collide with the rotating blades. The inventors have discovered that very efficient comminution of the cereal grain can be achieved by passing the combined stream of cereal and liquid through a sequence of chambers of relatively small volume, wherein each chamber contains one or more rotating blades as defined herein before. Alternatively, efficient milling can be achieved by passing the combined stream through a tube containing a sequence of two or more, preferably of a sequence of three or more rotating blades. The tube can be straight, but it may also be curved. The cross-section of the tube can take several shapes, e.g. circular or squarish.

Hence, in accordance with this preferred embodiment, the grain particles are disintegrated by passing the liquid holding the grain particles through two or more, even more preferably through three or more comminution chambers that each contain one or more of the rotating blades. The residence time within each of the comminution chambers preferably is within the range of 0.1-10 minutes, more preferably within the range of 0.1-4 minutes. Most preferably, the residence time within each of the comminution chambers is in the range of 0.2-2 minutes.

The rotating blades employed in the present method and system are suitably mounted onto a fast rotating shaft. Preferably, the present method and system employ one or more rotating blades that each comprise at least two blade wings that radially extend in different, e.g. opposite directions from a gravitational centre point that coincides with the rotational axis.

The wings of the rotating blades include leading edges and trailing edges. Preferably, at least a part of the leading edges of the blade wings is bevelled to provide a cutting edge. By providing the leading edges of the wings with a cutting edge the effectiveness of the rotating blades in disintegrating the grain particles can be further improved.

As explained herein before, the one or more blades employed in the present method and system advantageously provide an agitation action during operation. As the one or more blades rotate within the liquid holding the suspended grain particles, the (cutting) edges of the blades define a cutting path, and the wings generate flow of the liquid and the grain particles. The flow generated by the wings due to rotation of the one or more blades draws the liquid and suspended grain particles through the cutting path to homogeneously mix these components, and to disintegrate the grain particles entrained in the liquid using the cutting blades.

According to an advantageous embodiment, the one or more rotating blades act as stirring propellers, i.e. the blades act as rotating wings and generate a difference in pressure between the forward and rear surfaces of the blades. As a result of the stirring action of the blades disintegrated particles will be pushed away by the rotating blades so they can be replaced by other particles.

According to a particularly preferred embodiment, the one or more blades comprise at least two blade wings that are twisted, pitched or otherwise shaped such that the leading edges are vertically oriented above or below the trailing edges (when the rotational axis is vertical). If, for instance, the blade wings are twisted such that the leading edges are vertically oriented above the trailing edges, then rotation of the blender blade repeatedly draws the liquid (including the grain particles) through the cutting path. As such, rotation of the blender blade continuously draws the grain particles downwardly through the cutting path, and thereafter, pushes the particles upwardly along the interior surface of the comminution chamber. Consequently, the grain particles and liquid are homogeneously mixed because the grain particles are continually ground and mixed with the contents of the comminution chamber through rotation of the blade.

In accordance with a particularly preferred embodiment, the one or more blades comprise two or more wings whose leading edges define cutting paths and wherein said blade wings are oriented at compound angles with respect to the plane that runs perpendicular to the axis of rotation through the gravity centre of the blades so as to provide the blender blade with compound cutting paths.

Advantageously, each of the wings is twisted or otherwise shaped such that its leading edge is vertically oriented above or below its trailing edge, and angled such that its distal end is vertically oriented above or below the centre point (when the rational axis is vertical). In accordance with a particularly preferred embodiment, the leading edge of the blade wings is vertically oriented above its trailing edge and its distal end is vertically oriented above or below the centre point.

Up to a threshold, the greater the angles of the wings, and, most importantly, the twists of the wings, the greater the amount of lift associated with the blender blade. The blade wings may be twisted along the full length of the wing or, alternatively, a part of the blade wings can be twisted in order to generate adequate lift. Typically, the angle of the slope from the leading edge to the trailing edge of the blade wings does not exceed 60°, more preferably it does not exceed 45° (the angle of slope being defined relative to a horizontal plane, assuming a vertical rotational axis). Most preferably, the maximum angle of the slope from the leading edge to the trailing edge is in the range of 5-30°.

The blade wings employed in the present process advantageously extend radially outwards from a rotating axis. The blade wings can extend outwards at an upward or downward angle relative to the radial plane. This upward or downward angle relative to the radial plane preferably is within the range of 5-70°, more preferably within the range of 10-45°. Preferably a tip portion of the wing is tilted with respect to the radial plane at the aforementioned angles. Typically, said tip portion represents less than 60%, more preferably less than 50% of the length of the blade wing.

In an advantageous embodiment the one or more rotating blades comprise two or more blade wings extending in the same radial direction at different upward and downward angles. This arrangement of the blade wings offers the advantage that it increases the efficiency of the milling action.

Each of the blade wings has an effective width and a length measured between the axis of rotation and the distal ends of the wing tips, the ratio of the effective width to the length of the wings being in the range of 1:1 to 1:20, preferably in the range of 1:2-1:15.

As mentioned herein before, the rotating blades employed in the present method and system are rotating at very high speed. Typically, the one or more rotating blades are rotating at a speed of at least 2,000 rpm, more preferably of at least 10,000 rpm. The tip speed of the one or more rotating blades typically is at least 12 m/s, more preferably at least 15 m/s, more preferably at least 20 m/s, even more preferably at least 50 m/s and most preferably at least 70 m/s.

The benefits of the present invention are achieved by employing rotating blades of relatively small dimensions. On the one hand it is important to employ a rotating blade that is sufficiently long to ensure that along a significant part of the length of the blade the impact with which the blade hits the grain particles is sufficient to disintegrate these particles. At the same time, however, the length of the blade is bound to a maximum as the torque needed to rotate the blade at high tip speed increases exponentially with increasing blade length and also because long blades are much more vulnerable when operated at high rpm. Typically, the distance between a tip of the one or more rotating blades employed in the present method and the axis of rotation (i.e. the length of said one or more blades) is within the range of 2.5-20 cm, more preferably within the range of 2.5-18 cm and most preferably within the range of 3-15 cm. According to a particularly preferred embodiment the tips of all the rotating blades that rotate at a tip speed of at least 10 m/s, especially at a tip speed of at least 20 m/s, are located within 25 cm, more preferably within 20 cm, even more preferably within 18 cm and most preferably within 15 cm of the axis of rotation.

In order to ensure that the present method can be operated with little maintenance, it is advisable to employ rotating blades that are made of a shear resistant material selected from the group consisting of metals, ceramics, synthetic polymers, diamond and combinations thereof.

According to a particularly preferred embodiment, the one or more rotating blades have a thickness of 0.1-1 cm, more preferably of 0.2-0.8 cm and most preferably of 0.25-0.6 cm. It is advantageous to employ a blade of minimal thickness as this minimises rotational friction and maximizes the 'cutting' capability of the blade. Naturally, however, the thickness should be sufficient to warrant an adequate operational lifetime of the rotating blade.

The temperature of the liquid that is combined with the cereal grain prior to disintegration by the action of the rotating blades can vary within a wide range. Typically, the temperature of the liquid when it is combined with the cereal grain, is within the range of −5 to 100° C., preferably within the range of 10-60° C.

In order to achieve a significant reduction of the particle size of the cereal grain, a significant amount of mechanical energy has to be transferred by the one or more rotating blades into the milled suspension. Typically, the total amount of mechanical energy that transferred into the milled suspension by the one or more rotating blades is at least 8, more preferably at least 10 and most preferably at least 15 kJ per kg of dry cereal grain. The present method offers the advantage that considerable size reduction of the cereal grain can be achieved with a limited amount of mechanical energy transfer. Accordingly, the total mechanical energy transferred into the milled suspension by the one or more rotating blades advantageously does not exceed 800, more preferably does not exceed 500, more preferably does not exceed 300 kJ per kg of dry cereal grain.

The mechanical energy transferred into the milled suspension by the one or more rotating blades, in the absence of cooling or significant evaporation, will cause a temperature increase of the milled suspension. In the present method, the disintegration of the grain particles is typically accompanied by a temperature increase of the milled suspension of less than 100° C., more preferably of less than 60° C., and most preferably of less than 30° C. In order to avoid significant temperature increase, the suspension of grain particles may be cooled during the milling operation. According to a preferred embodiment, however, the disintegration of the grain particles is achieved without cooling the suspension.

The milled suspension may suitably be subjected to one or more further treatments before being transferred to a separation device for separation into spent grain and liquid extract. In accordance with a preferred embodiment, prior to separation into spent grain and liquid extract, the milled suspension is subjected to a mashing operation to allow enzymes to break down extracted starch into sugars, typically maltose.

Separation into spent grain and liquid extract may suitably be achieved any solid-liquid separation technique known in the art. Preferably, said separation is achieved by means of one or more separation devices selected from a mash filter, a centrifuge, a lautertun, a sieve. The present method is particularly suited for preparing a milled suspension that can be separated very efficiently by means of a mash filter. Hence, in a particularly advantageous embodiment, the present method employs a mash filter to separate the milled suspension into a spent grain and liquid extract.

Examples of cereal grains that can suitably be processed by the present method include barley, sorghum, rice, maize, buckwheat, rye, millet, malted versions of these cereal grains and combinations of these grains. According to a particularly preferred embodiment, the cereal grain of the present method includes barley, especially malted barley.

Further, the invention is illustrated with reference to the figures, wherein:

FIG. 1 schematically shows a first embodiment of a system according to an embodiment of the invention, FIG. 2 schematically shows a second embodiment, FIGS. 3a and 3b schematically show a detail of a blade according to an embodiment of the invention, FIG. 4 schematically shows a third embodiment, and FIG. 5 schematically shows an alternative arrangement of a milling apparatus according to the invention.

FIG. 1 provides a schematic example of an embodiment of the invention. The

Figure shows a cross section of a milling apparatus 1. Further FIG. 1 schematically shows a reactor 50 (e.g. a heat exchanger) and a separation device 20 (e.g. a device for separating solids from liquid) according to the invention. A system comprising the milling apparatus 1, a reactor 50 and a separation device 20 can be used in the preparation and production of a liquid extract of a cereal grain, such as wort.

The system according to the invention comprises one or more milling apparatuses 1. In an embodiment the system according to the invention comprises a series of two or more milling apparatuses 1. The two or more milling apparatuses 1 are preferably connected in series. It is also feasible to employ one milling apparatus containing a sequence of rotating blades, e.g. by using a tube holding two or more rotatable blades. The use of two or more milling apparatuses or of using a sequence of rotating blades enables efficient disintegration of the grain particles, as will be explained in more detail hereunder.

In FIG. 1 a liquid is introduced into a milling apparatus 1 through an inlet 2 into a milling chamber 3. In the embodiment according to the Figure the milling chamber 3 is a vessel or container. A second inlet 4 schematically represents the inlet for feeding cereal grain into the milling chamber 3. Although the inlets 2,4 are shown at a specific position, the skilled person is capable of positioning the inlets 2,4 at desired positions. In an embodiment one of the inlets brings the liquid or cereal grain into a middle portion of a milling chamber 3, e.g. close to blades 30,31. In another embodiment a mixture of liquid and cereal grain is introduced in milling apparatus 1 through inlet 2.

The milling chamber 3 contains a suspension of cereal grain. The suspension is shown in the Figure having a fluid level 13. However, in a preferred embodiment the milling chamber 3 is completely filled with fluid.

It is possible to control the inflow of liquid and cereal grain into the milling chamber. Parameters representing the amounts of inflow (schematically illustrated in FIG. 1 in the form of regulating valves 44 or dosing screw 45) can be collected in a controller 5 comprising a processor and memory (not shown). The controller 5 is connected, e.g. wireless, with a measuring device (not shown) for measuring the amount of inflow. The regulating valve 44 as well as the dosing screw 45 can comprise a means for controlling the amount of inflow into the milling chamber 3.

The controller 5 is connected with and can control a driving unit 6. Driving unit 6 schematically represents a unit that is capable of bringing rotor 7 into rotation at a desired speed. Driving unit 6 can be an electronically controlled engine. It can comprise a transmission.

Rotor 7 comprises a shaft 8 that extends into the milling chamber 3 suspended in schematically represented sealed shaft bearing 12. In an embodiment the driving unit 6 is also received in the milling chamber 3. In an embodiment a transmission is received in the milling chamber 3.

In an embodiment the rotation axis of the driving unit 6 is connected to the shaft 8 via a transmission. In an embodiment one driving unit 6 can be used to drive more than one shaft 8 of different milling apparatuses 1. In an embodiment one milling apparatus 1 comprises more than one shaft 8 having different blades 30,31.

Two blades 30,31 are mounted on shaft 8. A blade 30,31 is a replaceable unit that can be locked and unlocked onto shaft 8. In the illustrated example a sleeve 46 is interpositioned between the blades 30,31. The skilled person will be able to arrange different kinds of mounting systems for mounting and locking a blade 30,31 to the shaft 8.

In an embodiment blade 30 comprises three blade wings 9-11, as is shown in the embodiment of FIG. 3b. The distance 15 from the axis of rotation 14 to the tip 16 of a blade is at least 2 cm. Preferably, the distance 15 is at least 5 cm and more preferably at least 10 cm. In an embodiment the blades have a maximum length 15 of at most 25 cm, more preferably at most 20 cm. The blade 30 is arranged and constructed for rotation in a clockwise direction 28 as a sharp edge 29 will form the front edge of wings 9-11 during rotation. Further, the distal portion 27 of wings 9-11 comprises an upwardly bended fin 26. Fins 26 and sharp front edges 29 are arranged and constructed for pulverizing the grains present in the fluid contained in the milling chamber. Fins 26 are further arranged and constructed for stirring the fluid in operation.

According to the invention tip 16 will have a minimum speed of at least 10 m/s in order to create a blender-like effect during milling.

FIG. 3a shows a different embodiment of a blade 90. Blade 90 comprises a central sleeve like body 91 having four wings 92-95 extending radially from the sleeve like body 91. Each wing 92-95 comprises a generally radially extending portion 96 and a tip portion 97, more distal from the portion 96 that extends under an angle $\alpha$ upwards or downwards with respect to the radial plane 98. In an embodiment the wings 92-95 are also provided with a fin. This is not shown in FIG. 3a. The fin, or another part of the wing extending in a direction parallel to the shaft axis 14, can cause a disturbance in the fluid during rotation, causing mixing of the fluid in use, allowing milling of the complete fluid contained within the milling chamber 3.

In an embodiment the fins are arranged and constructed for causing a suction and pushing of fluid to and from the wing during rotation thereof to cause stirring in the fluid.

In an embodiment the shaft 8 extends from a bottom end of the milling chamber 3 upwards into the fluid contained in the milling chamber 3. The blades extend from the shaft close to a bottom surface of the milling chamber.

The controller 5 can control driving unit 6 to bring the blades into rotation. The driving unit is capable of rotating the tip 16 of the blade wings at at least 10 m/s, preferably at least 15 m/s. This will allow to obtain a kitchen blender effect at an industrial scale, which results in a system of preparing a liquid extract of cereal grain by comminuting cereal grain at a rate of at least 100 kg of dry cereal grain per hour being more effective than prior art systems.

Preferably, the apparatus 1 is arranged for continuous feed of liquid and cereal grain.

FIG. 2 shows a different embodiment, wherein a mixing chamber 60 is arranged upstream from a series of three milling apparatuses 61 and wherein other elements are similar to the first embodiment. Mixing chamber 60 comprises two inlets 62,63 for cereal grain and for water or an aqueous liquid, which are brought together in a generally drum shaped container comprising a mixing device 64 illustrated schematically. The mixing device comprises a blade 65 and a driving unit 66. Driving unit 66 and blade 65 are arranged to mix the fluid and grain. A preferably low RPM is used for mixing. In an embodiment the mixing chamber 60 is arranged to perform a milling pre-processing of the suspension. In the shown embodiment the mixed suspension flows to a first of three milling apparatuses 61 which have a similar set up as milling apparatus 1.

In operation the blades 30,31 and in particular the tips 16 of blade wings 9-11 will disintegrate grain particles suspended in the liquid contained in the milling chamber 3. The blade wings will, due to the high angular velocity and in particular due to the high speed of the tips 16 of the blade wings 9-11, transfer a substantial amount of kinetic energy into the suspension. Preferably the total mechanical energy transferred is at least 5 kJ per kg of dry cereal grain. The controller 5 is capable of monitoring that the speed of rotation is sufficient for transferring the suitable amount of kinetic energy into the suspension, i.e. sufficient kinetic energy to disintegrate grain particles in the suspension.

In order to increase the mixing of the suspended particles as a result of operation of the milling apparatus 1, the milling chamber could comprised one or more baffles 74,75 that extend in the shown embodiment radially inward from the milling chamber 3 wall. The baffles 74,75 can be part of a baffle body that is positioned in the milling chamber 3.

The first milling apparatus shown in FIG. 1 has an outlet 18. The outlet 18 can comprise a valve 19 (or a pump), which can be controlled by controller 5. The outlet 18 allows transport of the grain suspension to the next milling apparatus. The last milling apparatus has an outlet 21 which allows transport of the milled suspension to a reactor chamber 50 and further downstream to a separation device 20. Separation device 20 in this embodiment comprises a schematically illustrated mesh 22 upstream from outlet 23.

In an embodiment the separation device 20 further comprises a centrifuge. The skilled person in the preparation of liquid extracts of cereal grains will be familiar with different setups that can be used in combination with a milling apparatus according to the shown embodiment.

In an embodiment the outlet 18 is positioned generally at half-way height of the milling chamber 3. This will allow continuous transfer of milled fluid from the chamber 3. Near the bottom side the more heavier suspended particles will collect, while near a higher end there will be less suspended particles.

Although FIG. 1 shows a liquid level 13, it is also possible and in some embodiments preferred to operate the chambers without a gaseous phase of headspace present in the milling apparatus 1.

In an embodiment the transfer between the milling apparatuses 1,61 and towards a reaction chamber 50 is continuous. Subsequent transfer steps could be both batch and/or continuous.

Although FIG. 1 illustrates the system according to the invention in a very schematic way, the skilled person will be able to upgrade the shown embodiment to an industrial scale, using the invention as disclosed herein. In particular, the skilled person is capable of providing the system according to the invention in a brewery.

FIG. 4 schematically illustrates a third embodiment of a system according to the invention. FIG. 4 schematically shows a system comprising a mixing apparatus 100 and a milling apparatus 104, wherein said milling apparatus comprises a single milling chamber 105, wherein three schematically illustrated driving units and rotors 101,102,103 are received. Cereal grain 120 and water or an aqueous liquid 121 is added to the mixing chamber 112 to be converted into a suspension.

Mixing apparatus 100 comprises a rotor 111 received in mixing chamber 112, wherein also driving unit 113 connected to the rotor 111 is completely received in the mixing chamber 112.

Milling chamber 105 comprises three milling units 106-108 separated schematically by partitioning panels 109,110. The partitioning panels 109,110 are advantageously arranged in such a way that large (or coarse) particles contained in the suspension flowing through the milling chamber 105 are retained in milling units 106 and 107 respectively. In the illustrated example the large particles are retained by the partitioning panels 109 and 110 because the suspension level 122 in the mixing chamber 105 is sufficiently high to allow the suspension to overflow these panels into the next milling unit but not high enough to carry with it the large particles contained therein. Thus, large particles are retained in milling unit 106 and milling unit 107 until they have been disintegrated by the milling action to a particle size that can pass partitioning panel 109 or partitioning panel 110.

Downstream of milling chamber 105 a pump 115 supports flow of the suspension in accordance with the arrows indicated in the figure. A further separation of large particles can be achieved in separation element 116 downstream of pump 115. Recycle conduit 125 can produce a feedback flow of separated large particles towards one or more of the milling units 106,107,108.

The suspension containing adequately disintegrated particles flows downstream to reactor 117 and from there to a spent grain separator 118 to obtain liquid extract 119.

FIG. 5 illustrates a different embodiment of a milling apparatus 130. A driving unit 131 is connected to a frame, not shown. Further, stationary element 135 is connected fixedly to that frame. Driving unit 131 drives rotor body 133 carrying blades 136 into rotation according to arrow 138. Rotor body 133 is mounted rotatable 134 onto stationary element 135. Here the stationary element 135 is positioned at the position of the axis of rotation. The tip of the blades 136 is positioned near 139.

The invention is further illustrated by means of the following non-limiting examples.

EXAMPLES

Example 1

A continuous stream of 128 kg/h of malt was introduced into a milling chamber together with a continuous stream of 283 kg/h brewing water. In the milling chamber which had a volume of 6 L, a blade with a diameter of 8.5 cm rotated at 21,500 rpm. The product stream from this chamber was transferred to 2 similar chambers operated in series at identical process settings. This milling system was brought to steady state by milling for at least 20 min. at constant infeed conditions.

Product from the third milling chamber was collected and poured into a 100 L stirred mashing vessel. A typical mashing profile was used with: a 20 min. protein rest at 58° C., a heating phase to achieve 66° C. in 15 min., a saccharification rest at 66° C. for 25 min., again heating for 15 min to 76° C. and a final rest at this temperature for 10 min. Hereafter, the mash was transferred to a 2-chamber mash filter. The mash filter was operated in the same fashion as with hammer milled malt.

The resulting wort was pumped towards a boiling vessel and the wort was boiled for 90 min. After separation of hot trub and wort cooling to fermentation temperature, oxygen and yeast was added and a normal beer fermentation was performed. Wort samples were drawn and analysed, indicating an original gravity of the wort of 12.9% (w/w).

Final beer product was packaged in suitable containers (bottles) and analysed on beer quality parameters. Analysis on wort parameters and beer parameters indicated good mashing performance and good product quality. Of particular interest is the amount of fermentable sugars formed during the mashing process, indicating the availability of starch for enzymatic induced by the milling of the malt grains. In this example, a value of 69.8% (w/w) of the carbohydrates were fermentable sugars, resulting in an apparent final attenuation limit of 86% (w/w).

Example 2

Continuous streams of 200 kg/h of malt and 400 kg/h water are introduced into a mixing vessel, continuously stirred with an impeller to obtain a suspension. The mixture is transferred into a first milling chamber having a volume of 6 L. A blade with a diameter of 8.5 cm is rotated continuously at 21,500 rpm in the chamber. The product stream from this chamber is transferred to two similar chambers operated in series at identical process settings.

After this sequence of mixing chambers a positive displacement pump transfers the mixture into a vertical conversion reactor of 600 L volume. The reactor is fitted with a vertical axis on which discs are mounted to achieve mixing. A temperature profile along the height of the reactor is applied with a protein rest at 58° C., a saccharification rest at 67° C., and a final rest at 78° C. Hereafter, the mash is transferred to a decanter centrifuge to remove particles.

The resulting wort is pumped towards a boiling reactor of the same geometry as the conversion reactor and the wort is boiled for 60 min at 103° C. After separation of hot trub and wort cooling to fermentation temperature, oxygen and yeast are added and a normal beer fermentation is performed.

The invention claimed is:

1. A continuous method of preparing a liquid extract of cereal grain, comprising:
   (a) continuously combining cereal grain particles with a liquid;
   (b) continuously disintegrating the grain particles within the liquid by colliding freely suspended grain particles with one or more rotating blades, thereby producing a milled suspension; and
   (c) continuously transferring at least a part of the milled suspension to a separation device for separation of the suspension into spent grain and liquid extract;
   wherein the one or more rotating blades rotate at a tip speed of at least 10 m/s;
   wherein the total mechanical energy transferred into the milled suspension by the one or more rotating blades is in the range of 5-1000 kJ per kg of dry cereal grain; and
   wherein the distance between a tip of the one or more rotating blades and the axis of rotation is in the range of 2-25 cm.

2. The method according to claim 1, wherein the disintegration of the grain particles under the action of the one or more rotating blades does not result from stressing the grain particles between a surface of said one or more rotating blades and another solid surface.

3. The method according to claim 1, wherein the disintegration of the grain particles under the action of the one or more rotating blades causes a reduction of the mass weighted average particle size of the cereal grain by at least a factor 2.

4. The method according to claim 3, wherein the disintegration of the grain particles under the action of the one or more rotating blades causes a reduction of the mass weighted average particle size of the cereal grain by at least a factor 4.

5. The method according to claim 1, wherein prior to the disintegration under the action of the one or more rotating blades the grain particles contained within the liquid have a mass weighted average particle size of 0.5 mm to 1 cm.

6. The method according to claim 1, wherein the particles within the milled suspension have a mass weighted average diameter in the range of 50-1000 µm.

7. The method according to claim 1, wherein the liquid and the cereal grain are combined to form a suspension comprising 6-50 wt.% of dry matter.

8. The method according to claim 1, wherein the liquid is an aqueous liquid.

9. The method according to claim 1, wherein the one or more rotating blades are rotating with a tip speed of at least 15 m/s.

10. The method according to claim 9, wherein the one or more rotating blades are rotating with a tip speed of at least 50 m/s.

11. The method according to claim 1, wherein the distance between a tip of the one or more rotating blades and the axis of rotation is within the range of 2.5-20 cm.

12. The method according to claim 11, wherein the distance between a tip of the one or more rotating blades and the axis of rotation is within the range of 3-15 cm.

13. The method according to claim 1, wherein the total mechanical energy transferred into the milled suspension by the one or more rotating blades is in the range of 8-500 kJ per kg of dry cereal grain.

14. The method according to claim 13, wherein the total mechanical energy transferred into the milled suspension by the one or more rotating blades is in the range of 10-300 kJ/kg.

15. The method according to claim 1, wherein the cereal grain comprises barley, sorghum, rice, maize, buckwheat, rye, millet, malted versions of these cereal grains and combinations thereof.

16. A continuous method of preparing a liquid extract of cereal grain, comprising:
   (b) colliding grain particles in a liquid suspension with one or more rotating blades to produce a milled suspension; and
   (c) separating from at least part of the suspension spent grain and liquid extract;
   wherein the one or more rotating blades rotate at a tip speed of at least 10 m/s;
   wherein the total mechanical energy transferred into the milled suspension by the one or more rotating blades is in the range of 5-1000 kJ per kg of dry cereal grain; and
   wherein the distance between a tip of the one or more rotating blades and the axis of rotation is in the range of 2-25 cm.

* * * * *